United States Patent
Masini

(10) Patent No.: US 12,292,329 B1
(45) Date of Patent: May 6, 2025

(54) RECEIVER PHOTODIODE BIASING CIRCUIT

(71) Applicant: Cisco Technology, Inc., San Jose, CA (US)

(72) Inventor: Gianlorenzo Masini, Carlsbad, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/421,976

(22) Filed: Jan. 24, 2024

(51) Int. Cl.
*G01J 1/44* (2006.01)
*G02F 1/01* (2006.01)

(52) U.S. Cl.
CPC .......... *G01J 1/44* (2013.01); *G01J 2001/444* (2013.01); *G01J 2001/446* (2013.01); *G02F 1/0123* (2013.01)

(58) Field of Classification Search
CPC .. G01J 1/44; G01J 2001/444; G01J 2001/446; G02F 1/0123
See application file for complete search history.

(56) References Cited

U.S. PATENT DOCUMENTS

| | | | |
|---|---|---|---|
| 6,580,531 B1 | 6/2003 | Swanson et al. | |
| 11,209,675 B1 * | 12/2021 | Manzur | H04B 10/66 |
| 2004/0253003 A1 | 12/2004 | Farmer et al. | |
| 2017/0099111 A1 | 4/2017 | Asmanis et al. | |
| 2018/0294890 A1 | 10/2018 | Hutchinson et al. | |
| 2023/0277073 A1 * | 9/2023 | Yang | A61B 5/7214 600/478 |

OTHER PUBLICATIONS

Prosecution History for U.S. Appl. No. 18/156,280, dated Jan. 18, 2023, 43 Pages.

* cited by examiner

*Primary Examiner* — David P Porta
*Assistant Examiner* — Monica T Taba
(74) *Attorney, Agent, or Firm* — Patterson + Sheridan, LLP

(57) ABSTRACT

The present disclosure describes an optical system that uses a source optical signal to bias a receiver photodiode. The system includes an optical source, a receiver photodiode, a first biasing photodiode, a variable optical attenuator, and a compensation photodiode. The optical source produces a first optical signal. The receiver photodiode converts a second optical signal into an electrical signal. The first biasing photodiode generates a bias voltage for the receiver photodiode based on a first portion of the first optical signal. The variable optical attenuator produces a third optical signal based on (i) a second portion of the first optical signal and (ii) a portion of the electrical signal. The compensation photodiode passes the portion of the electrical signal based on the third optical signal.

19 Claims, 5 Drawing Sheets

RECEIVER PHOTODIODE BIASING CIRCUIT

TECHNICAL FIELD

Embodiments presented in this disclosure generally relate to optical communications. More specifically, embodiments disclosed herein relate to an optical circuit (e.g., an optical transceiver) with a receiver photodiode biasing circuit.

BACKGROUND

Optical transceivers include a receiver circuit that receives optical signals and converts those optical signals into electrical signals using a receiver photodiode. For the receiver photodiode to perform correct at high speeds, the receiver photodiode is typically biased with a voltage (e.g., 0.5 volts to 2 volts). The bias voltage should have a low noise level to avoid degrading the performance of the transceiver. In existing circuits, the receiver photodiode is biased using the supply voltage to the circuits. The supply voltage, however, is shared with other components in the circuits (e.g., other chips, analog drivers, signal processors, etc.), which introduces noise into the supply line and ground. This noise affects the biasing of the receiver photodiode, which degrades performance. Although the circuits may include regulators to remove or filter out the noise, these regulators are not ideal or perfect, which results in some of the noise continuing to degrade performance. The issue becomes more relevant as the different parts of the optoelectronic receiver (e.g., transimpedance amplifier (TIA), analog to digital converter, digital signal processor, etc.) are integrated on the same chip making isolation of power supply and ground lines more challenging. This trend is typically observed in modern transceivers.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
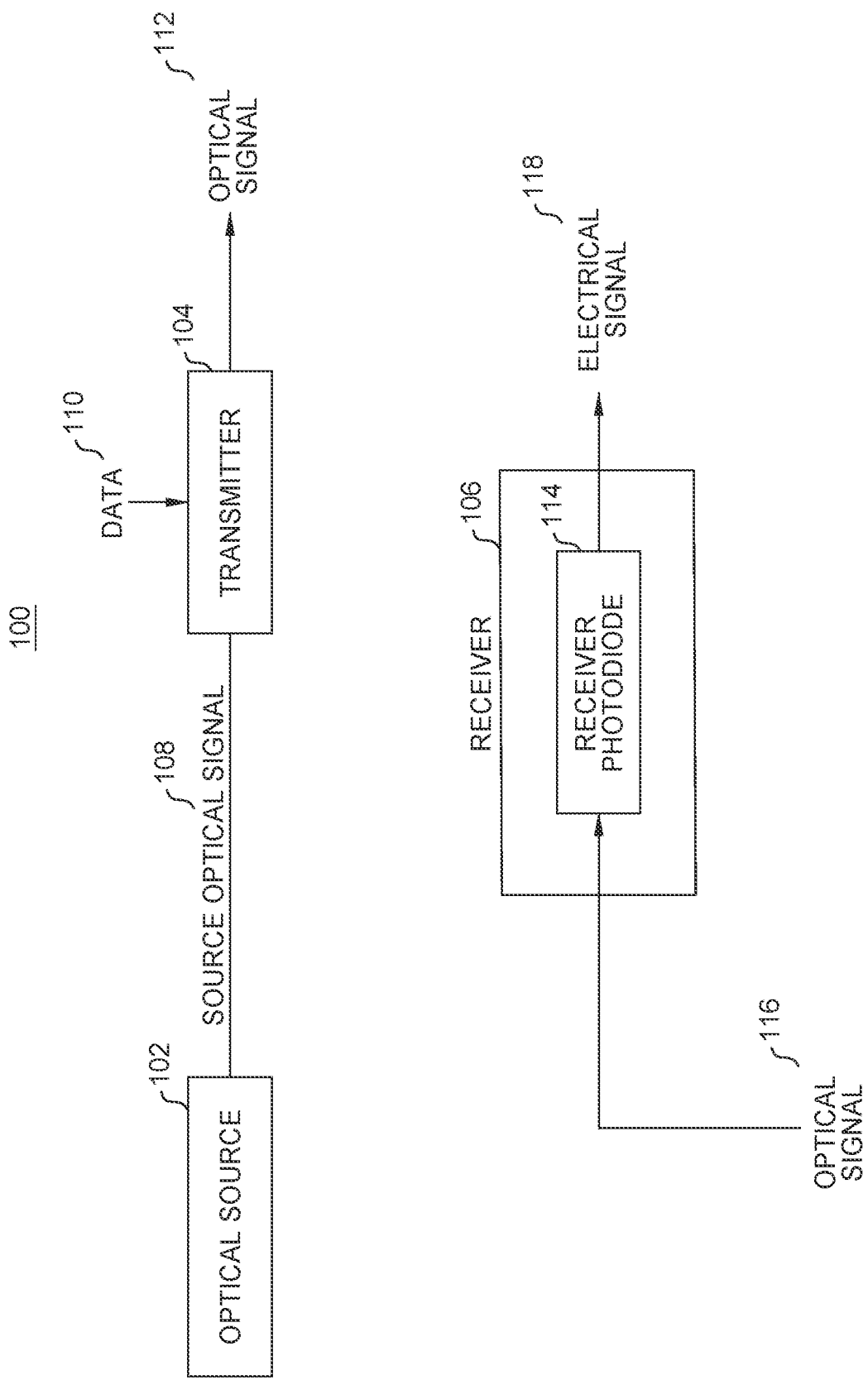
FIG. 1 illustrates an example system.

The present disclosure describes an optical system that uses a source optical signal to bias a receiver photodiode. According to an embodiment, a system includes an optical source, a receiver photodiode, a first biasing photodiode, a variable optical attenuator, and a compensation photodiode. The optical source produces a first optical signal. The receiver photodiode converts a second optical signal into an electrical signal. The first biasing photodiode generates a bias voltage for the receiver photodiode based on a first portion of the first optical signal. The variable optical attenuator produces a third optical signal based on (i) a second portion of the first optical signal and (ii) a portion of the electrical signal. The compensation photodiode passes the portion of the electrical signal based on the third optical signal.

According to another embodiment, a method includes producing, by an optical source, a first optical signal and converting, by a receiver photodiode, a second optical signal into an electrical signal. The method also includes generating, by a first biasing photodiode, a bias voltage for the receiver photodiode based on a first portion of the first optical signal and producing, by a variable optical attenuator, a third optical signal based on (i) a second portion of the first optical signal and (ii) a portion of the electrical signal. The method further includes passing, by a compensation photodiode, the portion of the electrical signal based on the third optical signal.

According to another embodiment, a circuit includes an optical source, a receiver photodiode, a photodiode array, and a compensation photodiode. The optical source produces a first optical signal. The receiver photodiode converts a second optical signal into an electrical signal. The photodiode array generates a bias voltage for the receiver photodiode based on the first optical signal. The compensation photodiode passes a portion of the electrical signal.

EXAMPLE EMBODIMENTS

The present disclosure describes an optical circuit (e.g., an optical transceiver) that uses one or more biasing photodiodes to bias a receiver photodiode in the optical circuit. The biasing photodiodes produce a bias voltage using a source optical signal from an optical source (e.g., a laser). The bias voltage is then used to bias the receiver photodiode. In one embodiment, the circuit also includes a compensation photodiode that removes a component (e.g., a direct current (DC) component) of the output of the receiver photodiode.

In certain embodiments, the optical circuit provides several technical advantages. For example, by biasing the receiver photodiode using the biasing photodiodes, the optical circuit reduces the noise in the circuit relative to existing circuits that bias the receiver photodiode using the supply voltage. The circuit also generates a fully differential electrical signal by compensating for the DC component thus allowing direct coupling to a differential TIA. As a result, the optical circuit may exhibit improved performance relative to existing circuits.

FIG. 1 illustrates an example system 100, which may be an optical transceiver. As seen in FIG. 1, the system 100 includes an optical source 102, a transmitter 104, and a receiver 106. Generally, the optical source 102 provides a source optical signal 108 that the transmitter 104 modulates with data 110 to produce an optical signal 112 for transmission. The receiver 106 includes a receiver photodiode 114 that converts a received optical signal 116 into an electrical signal 118 for processing.

The optical source 102 generates or produces the source optical signal 108. For example, the optical source 102 may be a laser or light that uses electrical energy to produce the source optical signal 108. The optical source 102 may direct the source optical signal 108 to other components in the system 100.

The transmitter 104 receives the source optical signal 108 from the optical source 102. The transmitter 104 may also receive data 110, which may be an electrical signal. The transmitter 104 includes a modulator that modulates the source optical signal 108 with the data 110 to produce the optical signal 112. The transmitter 104 then transmits the optical signal 112 (e.g., to another optical device) to communicate the data 110.

The receiver 106 receives the optical signal 116 (e.g., from another optical device). The optical signal 116 may carry data or other information. The receiver photodiode 114 converts the optical signal 116 into the electrical signal 118. The receiver 106 then directs the electrical signal 118 to another device or component for processing.

In existing optical systems (e.g., optical transceivers), the receiver photodiode 106 is biased using the supply voltage for the optical system. Using the supply voltage in this way, however, may introduce noise or cross-talk into the signal line in the optical system, which degrades performance. In the system 100, the receiver 106 includes one or more biasing photodiodes that use a portion of the source optical signal 108 to generate a bias voltage that biases the receiver photodiode 114. In this manner, the system 100 introduces less noise and cross-talk into the signal line relative to existing optical systems, which improves the performance of the system 100.

Figure 2:
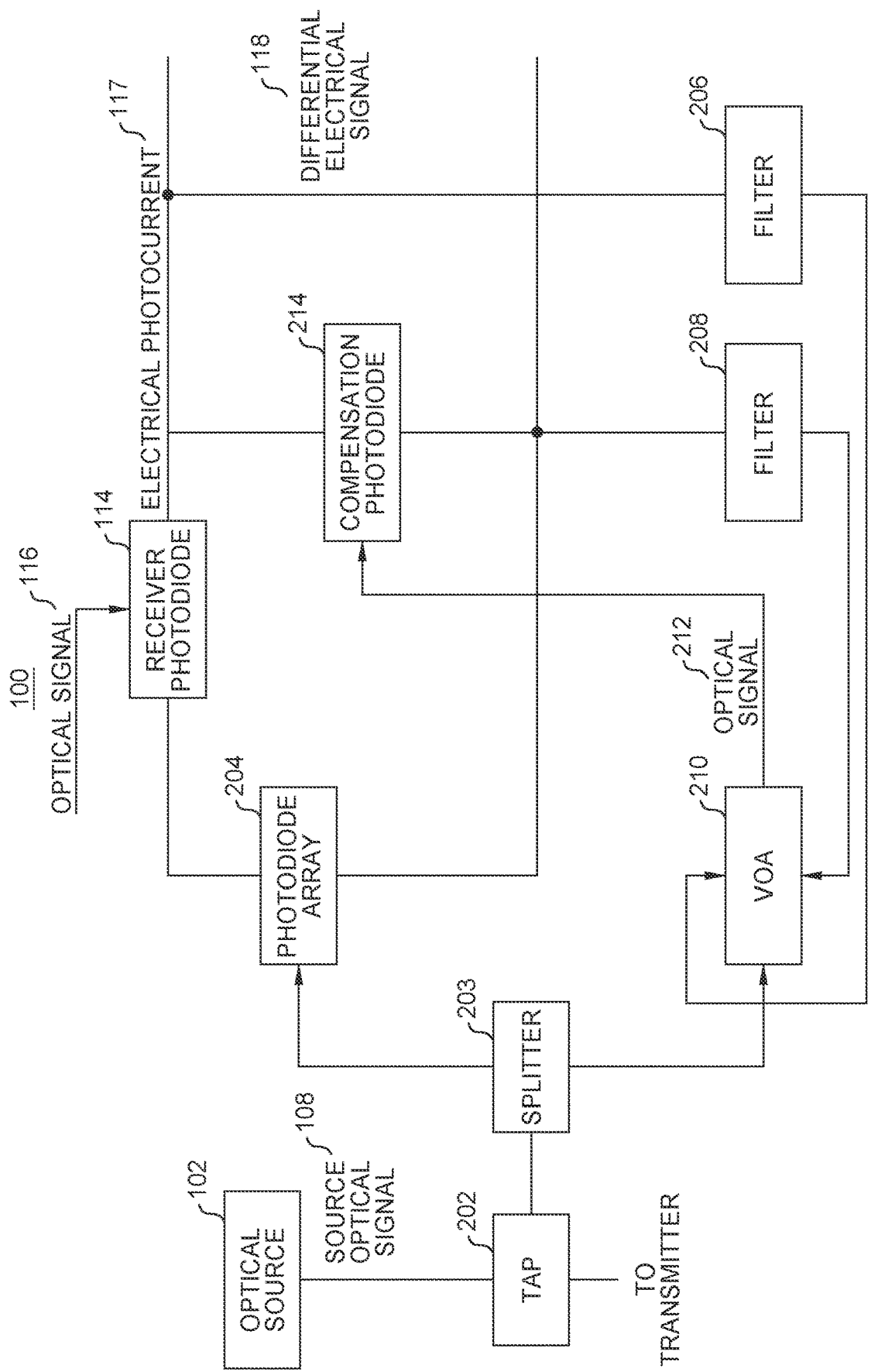
FIG. 2 illustrates a portion of the system of FIG. 1.

FIG. 2 illustrates a portion of the system 100 of FIG. 1. As seen in FIG. 2, the system 100 includes an optical tap 202, a splitter 203, a photodiode array 204, a filter 206, a filter 208, a variable optical attenuator (VOA) 210, and a compensation photodiode 214. Generally, the photodiode array 204 biases the receiver photodiode 114, and the compensation photodiode 214 removes a portion of the electrical photocurrent 117 (e.g., a direct current (DC) component) from the receiver photodiode 114 resulting in a fully differential electrical signal 118.

The optical source 102 produces the source optical signal 108. The tap 202 directs a portion of the source optical signal 108 to the splitter 203. The splitter 203 splits the portion of the source optical signal 108 into the photodiode array 204 and the VOA 210. The remaining portion of the source optical signal 108 from the optical source 102 is directed to the transmitter 104.

The photodiode array 204 includes one or more biasing photodiodes (e.g., arranged in series). The biasing photodiodes receive a portion of the source optical signal 108 from the tap 202 and the splitter 203. The biasing photodiodes then generate a bias voltage from the portion of the source optical signal 108. By adjusting the portion of the source optical signal 108 (e.g., adjusting power, intensity, etc.), the bias voltage produced by the biasing photodiodes may be increased or decreased. The bias voltage produced by the photodiode array 204 is then directed to the receiver photodiode 114 to bias the receiver photodiode 114. In this manner, the tap 202, the splitter 203, and the photodiode array 204 are used to control the bias voltage for the receiver photodiode 114.

The receiver photodiode 114 converts the optical signal 116 into an electrical photocurrent 117. The electrical photocurrent 117 may include a DC component and a radio frequency (RF) component. The compensation photodiode 214 removes or sinks the DC component from the electrical photocurrent 117, thus generating a fully differential electrical signal 118. The electrical signal 118 may be directed to subsequent components (e.g., a TIA). As a result, the compensation photodiode 214 provides DC offset compensation for the electrical photocurrent 117 by removing a DC current from the electrical photocurrent 117.

The filters 206 and 208 and the VOA 210 are used to control or adjust the compensation photodiode 214. The filters 206 and 208 may be low-pass filters that pass voltage (e.g., DC voltage). The filters 206 and 208 are positioned such that the filters 206 and 208 apply the voltage across the compensation photodiode 214 to the VOA 210. This voltage may drive the VOA 210. The VOA 210 also receives a portion of the source optical signal 108 from the tap 202 and the splitter 203. The VOA 210 attenuates the portion of the source optical signal 108 to produce the optical signal 212. The VOA 210 directs the optical signal 212 to the compensation photodiode 214. The compensation photodiode 214 removes or sinks a portion of the electrical photocurrent 117 depending on the optical signal 212 (e.g., depending on the intensity or power of the optical signal 212).

In some embodiments, the filters 206 and 208 apply the DC voltage across the compensation photodiode 214 to the VOA 210. The VOA 210 then adjusts the attenuation on the portion of the source optical signal 108 to produce the optical signal 212, which adjusts the compensation photodiode 214. The attenuation provided by the VOA 210 may depend on the DC voltage across the compensation photodiode 214 applied by the filters 206 and 208 to the VOA 210. The optical signal 212 may cause the compensation photodiode 214 to remove or sink the DC component of the electrical photocurrent 117 thus generating the fully differential electrical signal 118. The optical signal 212 may also maintain a substantially zero volt (e.g., within one or two millivolts of zero volts) bias across the compensation photodiode. In this manner, the filters 206 and 208 and the VOA 210 effectively create a feedback mechanism that causes the compensation photodiode 214 to remove, from the electrical photocurrent 117, the DC component of the electrical photocurrent 117.

In certain embodiments, the system 100 includes multiple compensation photodiodes 214 on different arms or branches. For example, the system 100 may include an additional compensation photodiode connected between the receiver photodiode 114 and the photodiode array 204. The additional compensation photodiode may be connected to opposite terminals of the receiver photodiode 114 and the photodiode array 204 than the compensation photodiode 214. Each arm or branch may provide a portion of an electrical signal to another portion of the system 100 for handling. Each compensation photodiode may remove a DC component from the electrical signal for an arm or branch. The same VOA 210 or a different VOA 210 may control each compensation photodiode for each arm or branch.

Figure 3:
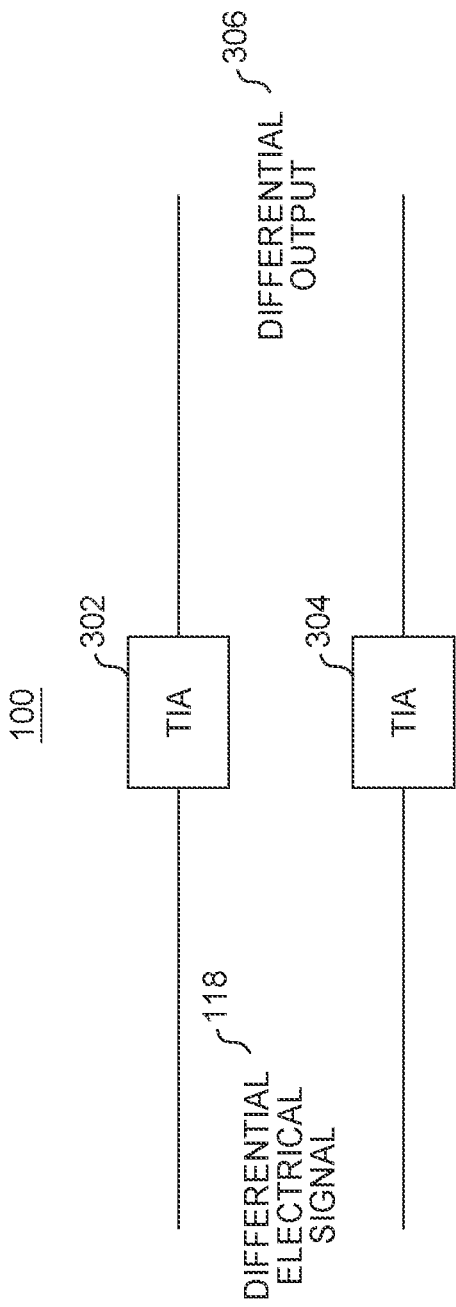
FIG. 3 illustrates a portion of the system of FIG. 1.

FIG. 3 illustrates a portion of the system 100 of FIG. 1. As seen in FIG. 3, the system 100 includes a TIA 302 and a TIA 304. The TIA 302 and the TIA 304 are connected in parallel with the compensation photodiode 214. As a result, if the compensation photodiode sinks or removes the DC component of the electrical photocurrent, then the TIA 302 and the TIA 304 receive only the RF component of the electrical photocurrent. Specifically, the TIA 302 and 304 receive a side of the fully differential electrical signal 118, thus implementing a fully differential TIA. The TIA 302 and the TIA 304 convert the electrical signal 118 into a voltage. The output of the TIA 302 and the TIA 304 form a differential output 306 (e.g., a differential output voltage). The differential output 306 may then be analyzed or processed to determine the data in the optical signal 116 that was received at the receiver photodiode 114.

Figure 4:
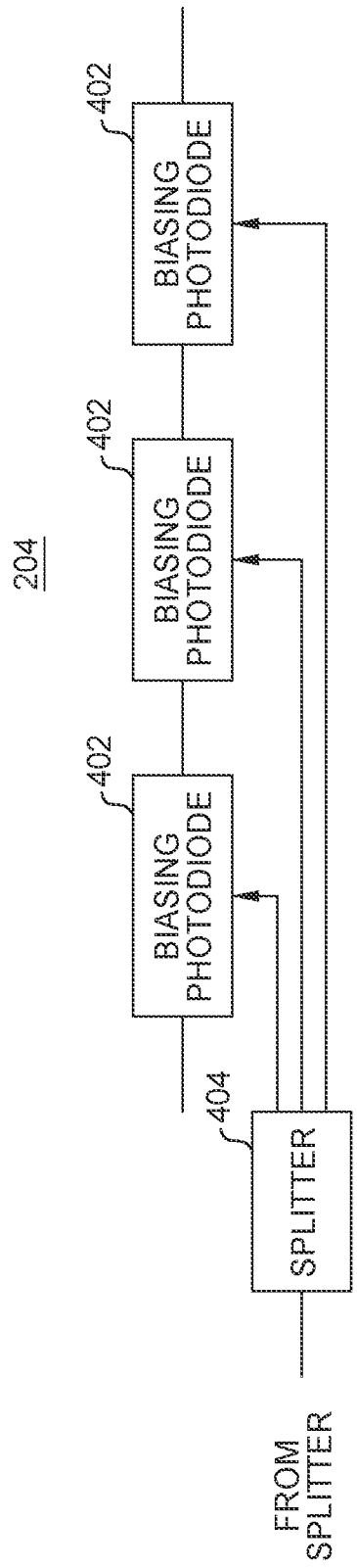
FIG. 4 illustrates an example photodiode array of the system of FIG. 1.

FIG. 4 illustrates an example photodiode array 204 of the system of FIG. 1. As discussed previously, the photodiode array 204 may receive the portion of the source optical signal 108 from the tap 202 and the splitter 203. As seen in FIG. 4, the photodiode array 204 includes biasing photodiodes 402 connected in series with each other and a splitter 404 distributing the optical power among the biasing photodiodes 402. The biasing photodiodes 402 may be operated in the photovoltaic mode in which power is generated and delivered to an external circuit. This can be accomplished by supplying enough optical power to the photodiode array 204. The photodiode array 204 may include any number of biasing photodiodes 402. For example, if the receiver photodiode 114 uses a two volt bias and each biasing photodiode 402 is a germanium photodiode that produces 0.5 volts, then four biasing photodiodes 402 would be included in the photodiode array 204 to generate the two volt bias.

The splitter 404 receives the portion of the source optical signal 108 from the tap 202 and the splitter 203. The splitter 404 inputs portions of the source optical signal 108 to the biasing photodiodes 402. Each of the biasing photodiodes 402 generates a bias voltage. The combined bias voltage from the biasing photodiodes 402 is used to bias the receiver photodiode 114 in the system 100. By biasing the receiver photodiode 114, the receiver photodiode 114 may produce a faster and more accurate response to the optical signal 116. In certain embodiments, by using the biasing photodiodes 402 to bias the receiver photodiode 114 instead of using a supply voltage, the noise in the system 100 is reduced, which improves performance.

In some embodiments, the photodiode array 204 also includes a regulator that stabilizes the bias voltage produced by the photodiode array 204. The regulator may be powered using the voltage produced by the photodiode array 204 from the portion of the source optical signal 108. Although the regulator increases the optical power consumption of the photodiode array 204, the regulator also helps the photodiode array 204 produce a more stable bias voltage for the receiver photodiode 114.

In certain embodiments, the frequency response of the photodiode array 204 is narrow, so any noise in the portion of the source optical signal 108 (e.g., due to instabilities in the optical source 102 or due to modulation) is filtered by the photodiode array 204 itself. The photodiode array 204 may include capacitors or regulators that further limit or reduce the noise level.

Figure 5:
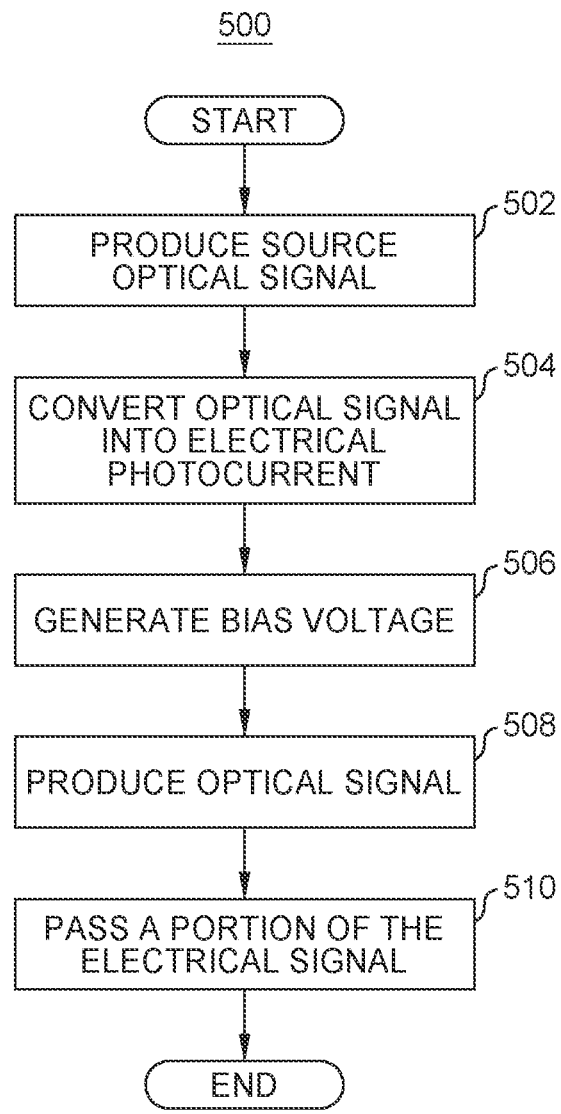
FIG. 5 is a flowchart of an example method performed by the system of FIG. 1.

FIG. 5 is a flowchart of an example method 500 performed by the system 100 of FIG. 1. In certain embodiments, by performing the method 500, the system biases a receiver photodiode 114 using a photodiode array 204 rather than a supply voltage, which reduces noise and cross-talk and improves performance.

In block 502, an optical source 102 produce a source optical signal 108. The optical source 102 may be a laser or a light that produces the source optical signal 108 when electrical power is supplied to the optical source 102. A tap 202 may direct a portion of the source optical signal 108 to a splitter 203. The splitter 203 may direct a portion of the source optical signal 108 to a photodiode array 204 that includes a biasing photodiode 402.

In block 504, a receiver photodiode 114 converts an optical signal 116 into an electrical photocurrent 117. The optical signal 116 may carry data. The electrical photocurrent 117 may include a DC component and an RF component. In block 506, the biasing photodiode 402 or the photodiode array 204 generates a bias voltage for the receiver photodiode 114. The bias voltage may cause the receiver photodiode 114 to have a faster and more accurate response to the optical signal 116. The biasing photodiode 402 or the photodiode array 204 may generate the bias voltage in response to the portion of the source optical signal 108 directed by the tap 202 and the splitter 203 to the photodiode array 204.

In block 508, a VOA 210 generates an optical signal 212 for a compensation photodiode 214. The VOA 210 may receive the DC voltage across the compensation photodiode 214 from the filters 206 and 208. The filters 206 and 208 may be low-pass filters that pass the DC voltage. The filters 206 and 208 may apply the DC voltage across the compensation photodiode 214 to the VOA 210. The VOA 210 may also receive a portion of the source optical signal 108 from the tap 202 and the splitter 203. The VOA 210 may attenuate the portion of the source optical signal 108 to produce the optical signal 212. The VOA 210 may adjust the attenuation to bring the DC voltage across the compensation photodiode 214 (which may be the bias voltage of the compensation photodiode 214) to substantially zero. By adjusting the attenuation, the VOA 210 adjusts the current that the compensation photodiode 214 removes or sinks from the electrical photocurrent 117. In some embodiments, the VOA 210 adjusts the attenuation so that the compensation photodiode 214 removes or sinks the DC component of the electrical photocurrent 117 to produce the differential electrical signal 118. In block 510, the compensation photodiode passes a portion (e.g., the DC component) of the electrical photocurrent 117. As a result, the RF component of the electrical photocurrent 117 may be directed (e.g., to the TIAs 302 and 304) for further handling as the fully differential electrical signal 118.

Figure 6:
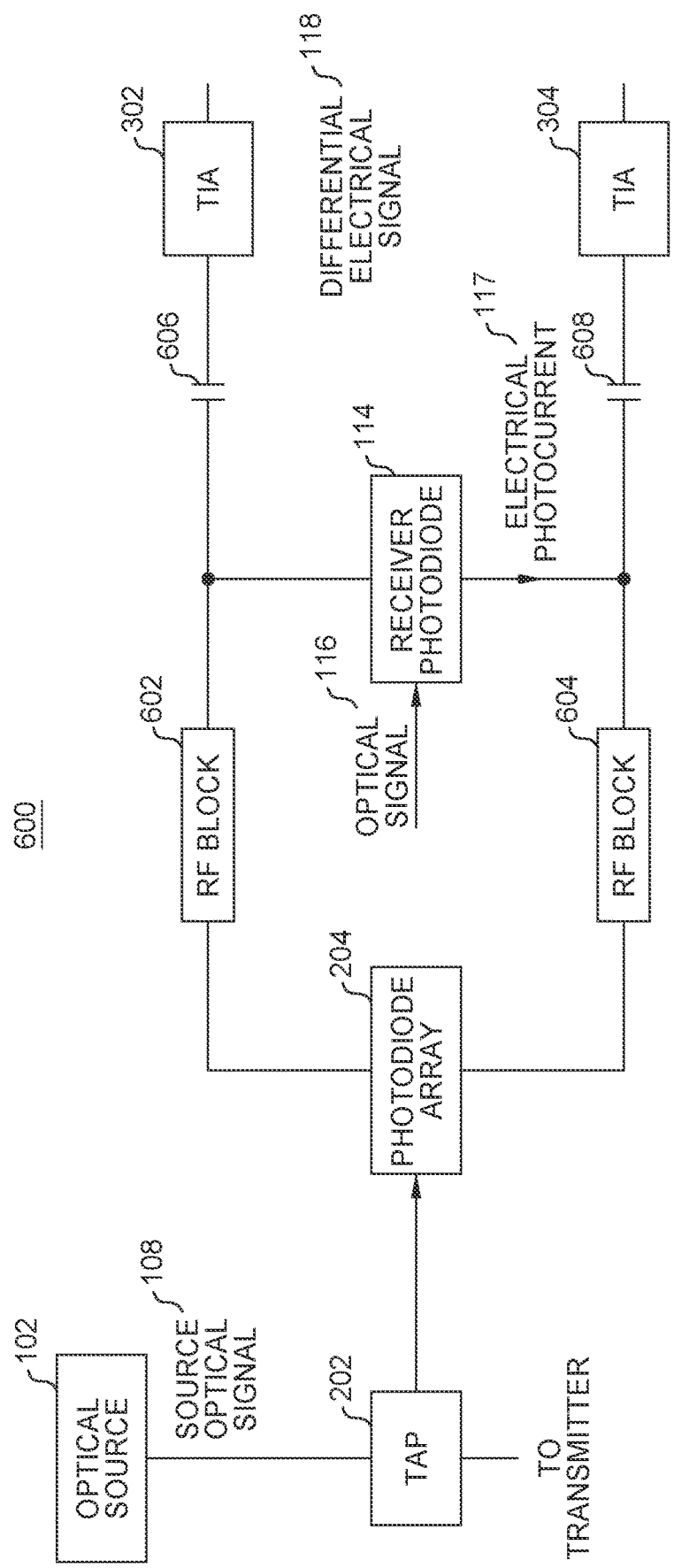
FIG. 6 illustrates an example system.

FIG. 6 illustrates an example system 600. Generally, the system 600 may include an alternative design to the system 100. The system 600 may include several of the same components as the system 100. For example, the system 600 includes the optical source 102 that produces the source optical signal 108. The system 600 also includes the tap 202 that directs a portion of the source optical signal 108 to the photodiode array 204. The photodiode array 204 uses the portion of the source optical signal 108 to produce a bias voltage for the receiver photodiode 114. The receiver photodiode 114 converts the optical signal 116 to the electrical photocurrent 117.

The system 600 may not include the compensation photodiode 214 that sinks or removes the DC component of the electrical photocurrent 117. Instead, the system 600 includes an RF block 602 and an RF block 604 between the receiver photodiode 114 and the photodiode array 204. The RF block 602 and the RF block 604 may include filters that prevent the RF component of the electrical photocurrent 117 to flow back to the photodiode array 204. Additionally, the system 600 includes capacitors 606 and 608 positioned between the receiver photodiode 114 and the TIAs 302 and 304. The capacitors 606 and 608 may prevent the DC component of the electrical photocurrent 117 from flowing to the TIAs 302 and 304. In this manner, the RF blocks 602 and 604 and the capacitors 606 and 608 effectively separate and direct the DC component and the RF component of the electrical photocurrent 117. As a result, the differential electrical signal 118 continues to flow to the TIAs 302 and 304.

In summary, the system 100 may be an optical circuit (e.g., an optical transceiver) that uses one or more biasing photodiodes 402 to bias a receiver photodiode 114 in the optical circuit. The biasing photodiodes 402 produce a bias voltage using a source optical signal 108 from an optical source 102 (e.g., a laser). The bias voltage is then used to bias the receiver photodiode 114. The circuit also includes a compensation photodiode 214 that removes a component (e.g., a DC component) of the output of the receiver photodiode 114.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s).

In view of the foregoing, the scope of the present disclosure is determined by the claims that follow.

I claim:

1. A system comprising:
   an optical source arranged to produce a first optical signal;
   a receiver photodiode arranged to convert a second optical signal into an electrical signal;
   a first biasing photodiode arranged to generate a bias voltage for the receiver photodiode based on a first portion of the first optical signal;
   a variable optical attenuator arranged to produce a third optical signal based on (i) a second portion of the first optical signal and (ii) a portion of the electrical signal; and
   a compensation photodiode arranged to pass the portion of the electrical signal based on the third optical signal.

2. The system of claim 1, further comprising a second biasing photodiode arranged to generate a bias voltage for the receiver photodiode based on a third portion of the first optical signal.

3. The system of claim 1, wherein the portion of the electrical signal is a direct current (DC) component of the electrical signal.

4. The system of claim 3, further comprising a transimpedance amplifier arranged to receive a radio frequency component of the electrical signal rather than the DC component of the electrical signal.

5. The system of claim 1, wherein the third optical signal causes the compensation photodiode to maintain a substantially zero volt bias across the compensation photodiode.

6. The system of claim 1, further comprising a filter arranged to pass a portion of a voltage of the electrical signal to the variable optical attenuator.

7. The system of claim 1, further comprising an optical tap arranged to produce the first portion of the first optical signal and the second portion of the first optical signal from the first optical signal.

8. A method comprising:
   producing, by an optical source, a first optical signal;
   converting, by a receiver photodiode, a second optical signal into an electrical signal;
   generating, by a first biasing photodiode, a bias voltage for the receiver photodiode based on a first portion of the first optical signal;
   producing, by a variable optical attenuator, a third optical signal based on (i) a second portion of the first optical signal and (ii) a portion of the electrical signal; and
   passing, by a compensation photodiode, the portion of the electrical signal based on the third optical signal.

9. The method of claim 8, further comprising generating, by a second biasing photodiode, a bias voltage for the receiver photodiode based on a third portion of the first optical signal.

10. The method of claim 8, wherein the portion of the electrical signal is a direct current (DC) component of the electrical signal.

11. The method of claim 10, further comprising receiving, by a transimpedance amplifier, a radio frequency component of the electrical signal rather than the DC component of the electrical signal.

12. The method of claim 8, wherein the third optical signal causes the compensation photodiode to maintain a substantially zero volt bias across the compensation photodiode.

13. The method of claim 8, further comprising passing, by a filter, a portion of a voltage of the electrical signal to the variable optical attenuator.

14. The method of claim 8, further comprising producing, by an optical tap, the first portion of the first optical signal and the second portion of the first optical signal from the first optical signal.

15. A circuit comprising:
   an optical source arranged to produce a first optical signal;
   a receiver photodiode arranged to convert a second optical signal into an electrical signal;
   a photodiode array arranged to generate a bias voltage for the receiver photodiode based on the first optical signal;
   a compensation photodiode arranged to pass a portion of the electrical signal; and
   a variable optical attenuator arranged to produce a third optical signal based on (i) a portion of the first optical signal and (ii) the portion of the electrical signal, wherein the compensation photodiode passes the portion of the electrical signal based on the third optical signal.

16. The circuit of claim 15, wherein the portion of the electrical signal is a direct current (DC) component of the electrical signal.

17. The circuit of claim 16, further comprising a transimpedance amplifier arranged to receive a radio frequency component of the electrical signal rather than the DC component of the electrical signal.

18. The circuit of claim 15, wherein the third optical signal causes the compensation photodiode to maintain a substantially zero volt bias across the compensation photodiode.

19. The circuit of claim 15, further comprising a filter arranged to pass a portion of a voltage of the electrical signal to the variable optical attenuator.

* * * * *